(12) United States Patent
Lee et al.

(10) Patent No.: US 7,116,160 B2
(45) Date of Patent: Oct. 3, 2006

(54) BOOSTER

(75) Inventors: Wen-Kei Lee, Taipei Hsien (TW); Tien-Hao Feng, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 0 days.

(21) Appl. No.: 10/710,673

(22) Filed: Jul. 28, 2004

(65) Prior Publication Data

US 2005/0195022 A1 Sep. 8, 2005

(30) Foreign Application Priority Data

Mar. 5, 2004 (TW) .............................. 93105973 A

(51) Int. Cl.
*H02M 3/07* (2006.01)

(52) U.S. Cl. .................. 327/589; 327/306; 327/331; 327/332; 361/91.1; 361/18; 361/98

(58) Field of Classification Search ............ None
See application file for complete search history.

(56) References Cited

U.S. PATENT DOCUMENTS

| | | | | |
|---|---|---|---|---|
| 5,119,045 A | * | 6/1992 | Sato | 332/109 |
| 5,436,550 A | * | 7/1995 | Arakawa | 323/222 |
| 5,627,500 A | * | 5/1997 | Wolaver et al. | 332/112 |
| 5,905,369 A | * | 5/1999 | Ishii et al. | 323/272 |
| 6,178,104 B1 | * | 1/2001 | Choi | 363/89 |
| 6,185,082 B1 | * | 2/2001 | Yang | 361/90 |
| 6,222,746 B1 | * | 4/2001 | Kim | 363/89 |
| 6,373,735 B1 | * | 4/2002 | Usui | 363/89 |
| 6,462,598 B1 | * | 10/2002 | Okayasu et al. | 327/276 |
| 6,900,995 B1 | * | 5/2005 | Muegge et al. | 363/21.05 |

FOREIGN PATENT DOCUMENTS

CN   1452307 A   10/2003

OTHER PUBLICATIONS

"Triple-Channel PWM Control Circuits", Texas Instruments, Jan. 2000, pp. 1-2, TPS5100.

* cited by examiner

Primary Examiner—Tuan T. Lam
Assistant Examiner—Hiep Nguyen
(74) Attorney, Agent, or Firm—Winston Hsu

(57) ABSTRACT

A booster includes a boosting circuit and a feedback control circuit. The boosting circuit is used to boost an input voltage into a predetermined output voltage; the feedback control circuit detects the output voltage of the boosting circuit and stops boosting the voltage when the output voltage is higher than a predetermined value so as to prevent additional power consumption of a battery and increase transferring efficiency.

13 Claims, 4 Drawing Sheets

BOOSTER

BACKGROUND OF INVENTION

1. Field of the Invention

The present invention relates to a booster, and more particularly to a booster of a fuel cell.

2. Description of the Prior Art

Energy plays an essential role in our lives. With the improvement and progress of technology, different power-supply equipment has been invented for different sorts of electrical products. The design and quality of power-supply systems may directly influence the quality of electrical systems. A stable power supply allows electrical equipment to work in a stable condition, and also allows better performance with less noise. On the other hand, if the power supply is unstable, unexpected operation or circuit malfunction can occur. Therefore, increasingly higher quality of today's electrical products is needed, so that producing good and stable power supplies has become an important issue.

A fuel cell is a kind of environmental energy source. However, fuel cells can only provide lower electrical power than the operation power of normal electrical products. Furthermore, a fuel cell outputs different voltage because of different external electrical equipment connected to the fuel cell. For solving this problem, a transformer is added external to the fuel cell for adjusting the output voltage of the fuel cell to a predetermined voltage value to provide a fixed and high-stability power supply to different sorts of electrical products.

Please refer to FIG. 1, which is a diagram of a booster 10 external to a battery 12 according to the prior art. The booster 10 comprises a boosting circuit 11, a battery 12, and a feedback oscillation controller 14. The boosting circuit 11 is electrically connected to the battery 12 and used for adjusting the voltage of the battery 12 to a predetermined voltage value. The feedback oscillation controller 14 detects the output voltage of the boosting circuit 11 and utilizes the output voltage as a feedback signal to change the period of the oscillating signal generated by the feedback oscillation controller 14 for controlling the boosting circuit 11.

Tank devices, such as capacitors and inductances, are often set up inside the boosting circuit 11. These tank devices need a periodic signal or an AC signal to store or transform energy. The oscillating signal generated by the feedback oscillation controller 14 is therefore provided to the boosting circuit 11 for boosting.

The theory behind the function of the feedback oscillation controller 14 is to utilize an oscillating signal of pulse width modulation to control the boosting circuit 11. If the output voltage added by the booster does not reach a predetermined value, the feedback oscillation controller 14 outputs an oscillating signal with a longer period to make boosting faster. Similarly, if the output voltage added by the booster has reached the predetermined value, the feedback oscillation controller 14 outputs an oscillating signal with a shorter period to make the boosting slower.

However, even when the output voltage of the prior art booster has reached the predetermined value, the feed-back oscillation controller 14 still continuously outputs oscillating signals. But in fact, at this time, the boosting circuit 11 does not need the oscillating signals because the mechanism of boosting can be paused. As a result of the continuous oscillating signals outputted by the feed-back oscillation controller 14, the following disadvantages could occur. First, power is lost unnecessarily when there is no need for boosting. And second, because of the power consumption inside the booster, the battery can only provide lower power to the external loads. As a result, there is a need for a booster that can stop the function of charging when the output voltage reaches the predetermined value to solve the prior art problems.

SUMMARY OF INVENTION

It is therefore a primary objective of the claimed invention to provide a booster to solve the above-mentioned problems.

According to the claimed invention, a booster comprises a boosting circuit for boosting an input voltage to a predetermined output voltage; an oscillator for generating oscillating signals when the boosting circuit boosts the input voltage; and a voltage detector electrically connected to the boosting circuit for stopping the boosting circuit from boosting the input voltage when the output voltage of the boosting circuit is higher than a specific predetermined voltage.

A claim method of boosting battery output, the battery electrically connected to a booster comprising a boosting circuit, an oscillator, and a voltage detector, the method comprising:

(a) detecting an output voltage of the booster with the voltage detector;

(b) if the output voltage is lower than a predetermined voltage, with the oscillator generating a periodic pulse signal for controlling a transistor of the booster to execute an on/off operation for adjusting the output voltage; and (c) if the output voltage reaches the predetermined voltage value, with the voltage detector generating a voltage signal whose logic level is zero for turning off the transistor.

These and those objectives of the present invention will no doubt become obvious to those of ordinary skill in the art after reading the following detailed description of the preferred embodiment that is illustrated in the various figures and drawings.

DETAILED DESCRIPTION

Figure 1:
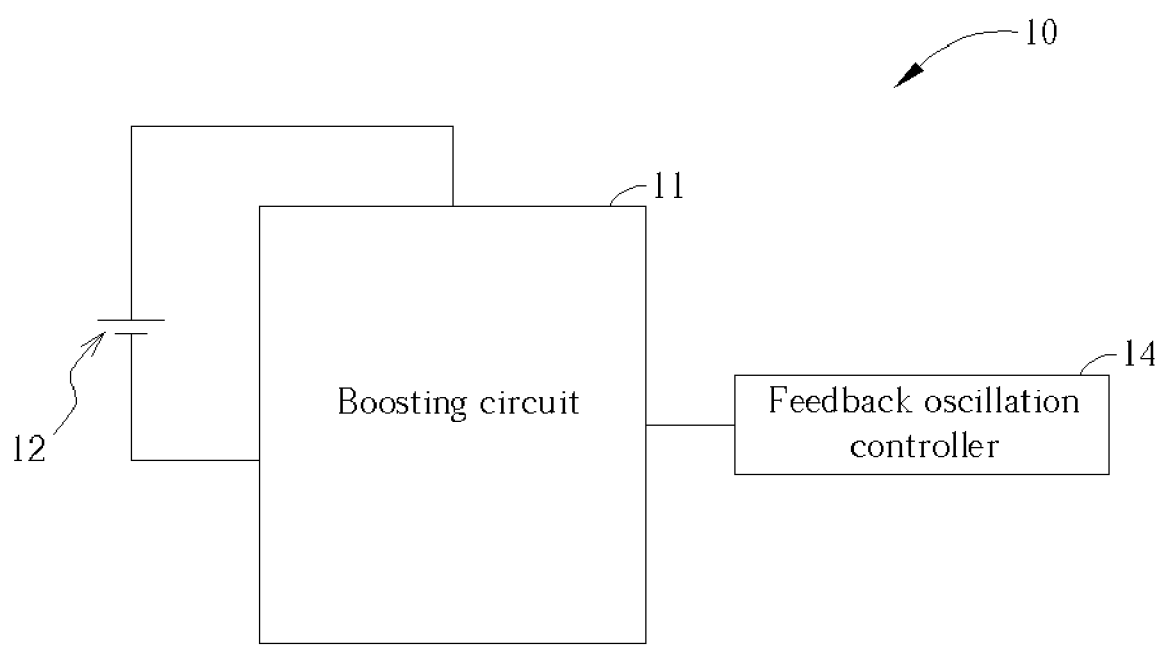
FIG. 1 is a diagram of a booster according to the prior art.
Figure 2:
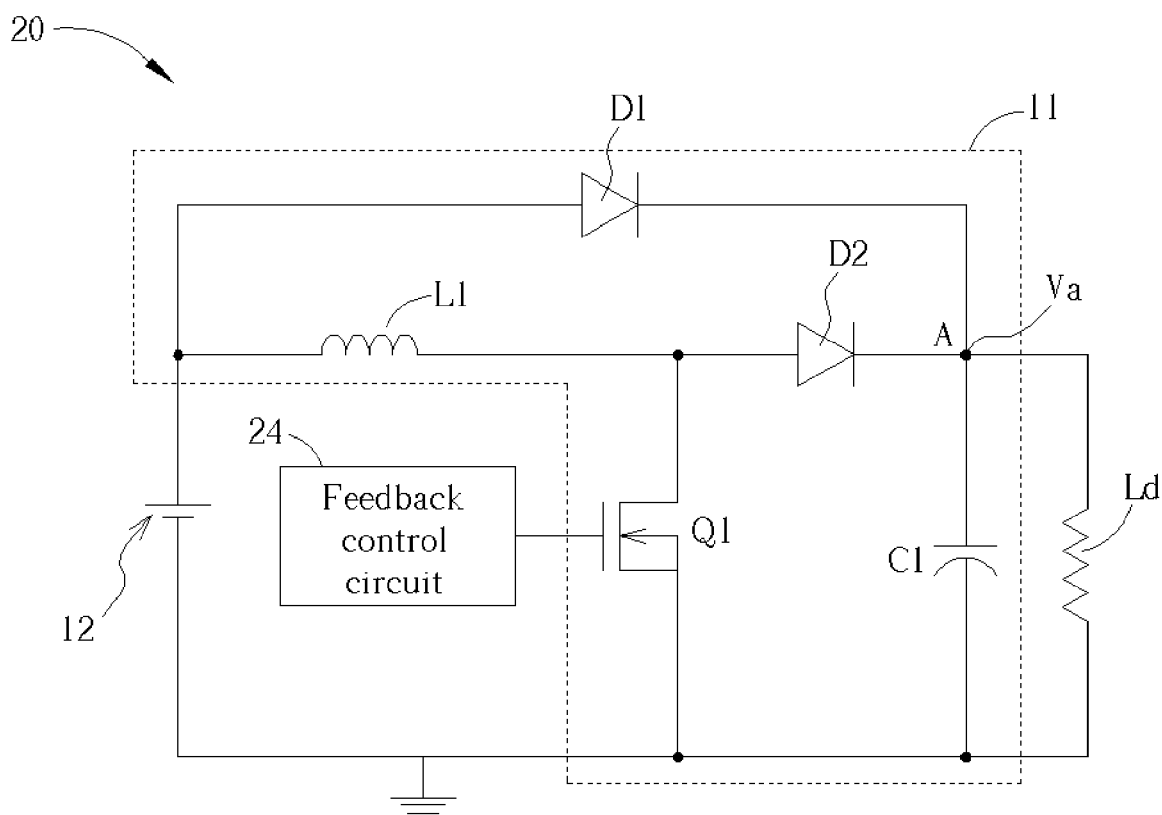
FIG. 2 is a diagram of a booster according to the present invention.

Please refer to FIG. 2, which is a diagram of a booster 20 according to the present invention. The booster 20 comprises a boosting circuit 11, a battery 12, and a feedback control circuit 24. The boosting circuit 11 comprises two diodes D1 and D2, an inductance L1, a capacitor C1 and a MOS transistor Q1. The boosting circuit 11 in FIG. 2 is similar to the booster circuit in FIG. 1. The boosting circuit 11 utilizes the inductance L1 and the capacitor C1 to transfer power of the battery to the capacitor C1 so that a voltage Va can be boosted continuously while the capacitor C1 is charged. Because inductances need an AC signal for continuously performing the process of charging/discharging, the transistor Q1 is therefore controlled by the feedback control circuit 24 for executing the on/off operation at a specific frequency and stopping the on/off operation when the voltage Va has reached the predetermined value.

The operation of the boosting circuit 11 is illustrated as follows: The boosting circuit 11 utilizes the capacitor C1 to store the electrical power. So the current of the battery 12 is utilized to charge the capacitor C1 for boosting the voltage of the node A. We assume that the voltage provided by the battery is 2V. At first, the voltage of 2V is transferred to the node A through the diode D1 and makes the voltage Va of node A near to 2V. And then, when the transistor Q1 is on, the battery 12, the inductance L1, and the transistor Q1 form a loop where the battery 12 is regarded as a power supply, and the inductance L1 and the transistor Q1 are regarded as loads. Therefore, the end of the inductance L1 that is near to the battery 12 is positive, and the other is negative, and a current passes through the inductance L1. In the situation that the transistor Q1 is off, the instantaneous current on the inductance L1 is the same as the current before the transistor Q1 is off according to the characteristic of the inductance. At this time, the inductance L1 is regarded as a power supply that provides a current to the diode D2, and because the transistor Q1 is off, the current charges the capacitor C1 through the diode D2. Because the voltage generated by the inductance L1 is series-connected to the battery 12, the voltage of capacitor C1 starts to rise.

As the voltage of capacitor C1 rises, the charging current becomes lower and lower. This can be regarded as the power of the inductance L1 transferring to the capacitor C1. Therefore, the power in the inductance L1 has to be renewed periodically. So the transistor Q1 has to switch modes (on/off) during the whole boosting procedure for providing the power to the inductance L1 and for transferring the power to the capacitor C1 for boosting. The characteristic of the prior art diode is that the current can pass through the diode if the diode is forward biased, otherwise the diode prevents current flow. The purpose of the diode D2 is to avoid the reversed current and to make sure that the direction of the current is correct (from the inductance L1 to the capacitor C1).

Figure 3:
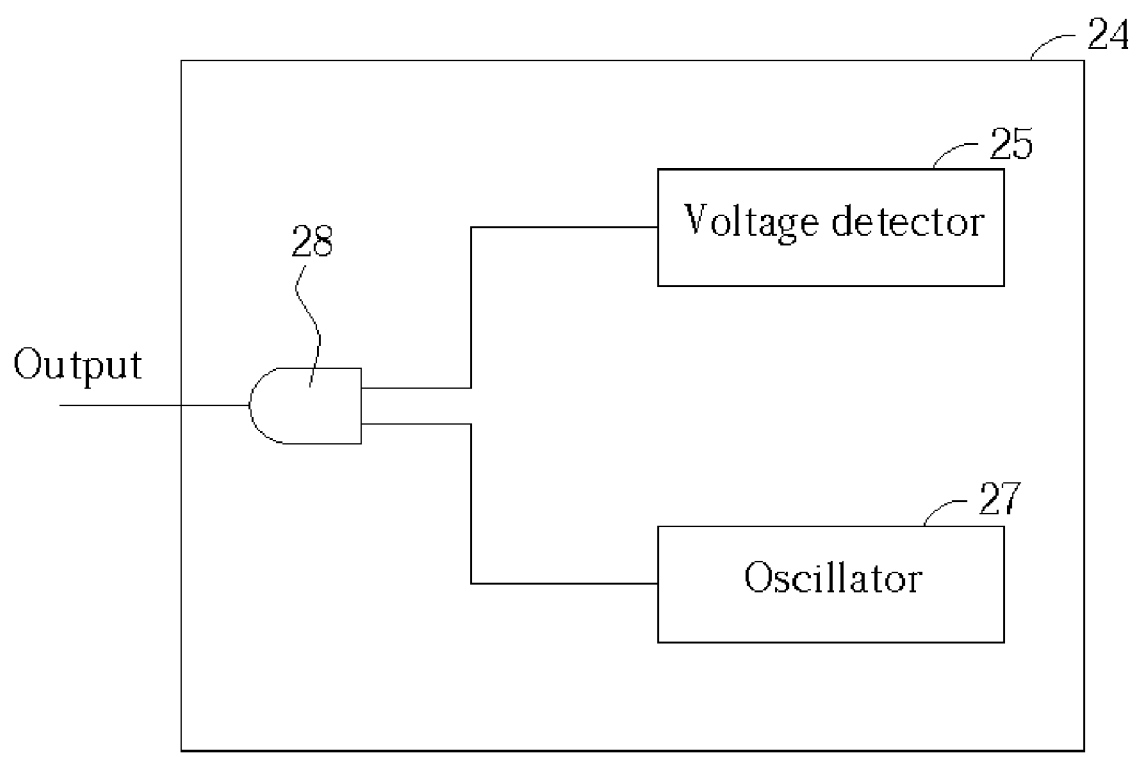
FIG. 3 is a diagram of a feedback control circuit according to the present invention.

Please refer to FIG. 3, which is a diagram of a feedback control circuit 24 according to the present invention. The feedback control circuit 24 comprises a voltage detector 25, an oscillator 27, and an AND gate 28. The operation of the feedback control circuit 24 is as follows: First the voltage Va is detected. If the voltage Va is less than a predetermined value, generate periodic signals for controlling the on/off operation of the transistor Q1. And if the voltage Va is larger than the predetermined value, generate a low voltage whose logic level is 0 for turning off the transistor to make the boosting circuit 11 stop boosting.

The voltage detector 25 detects the voltage Va and generates a feedback signal of the feedback control circuit 24 according to the detected voltage Va. If the voltage Va is larger than or equal to the predetermined value, the voltage detector 25 outputs a signal whose logic level is 0 to the AND gate 28, otherwise the voltage detector 25 outputs a signal whose logic level is 1. The output end of the oscillator 27 is electrically connected to the AND gate 28 for generating an oscillating signal. The operation flow of the feedback control circuit 24 is, for example, illustrated as follows: It is assumed that the booster 20 according to the present invention needs to boost the voltage Va from the voltage 2V provided by the battery to 3.5V. Therefore, the voltage Va is less than 3.5 V at first, and the voltage detector 25 outputs a signal of logic 1 so that the oscillating signals generated by the oscillator 27 can pass through the AND gate 28. And then the voltage Va continuously increases until the voltage reaches 3.5V. When the voltage reaches 3.5V, the voltage detector 25 immediately detects the situation and outputs a signal of logic level 0 so that the output signal of the AND gate is 0. Therefore, the transistor is turned off and stops boosting.

Figure 4:
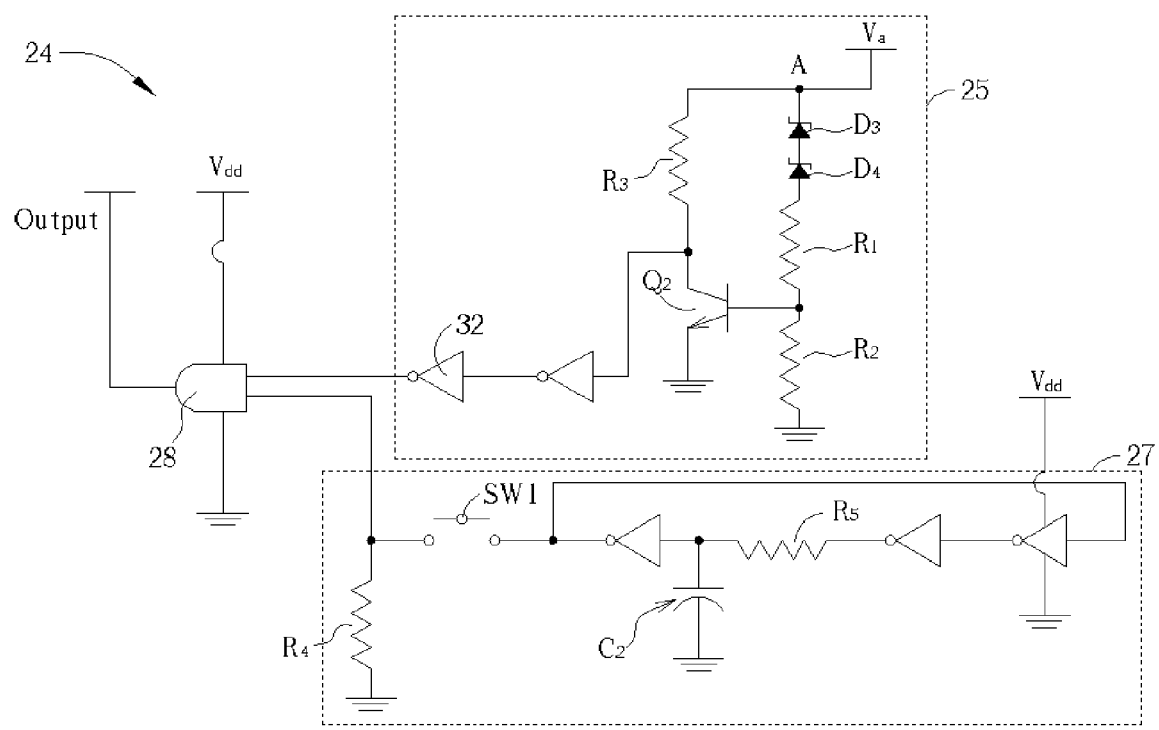
FIG. 4 is a diagram of a first embodiment of the feedback control circuit according to the present invention.

Please refer to FIG. 4, which is a diagram of the first embodiment of the feedback control circuit according to the present invention. The voltage detector 25 of the feed-back control circuit 24 comprises two diodes D3 and D4, three resistors R1, R2, and R3, a bipolar junction transistor (BJT) Q2, and two inverters 32. The emitter of the BJT Q2 is grounded, the base of the BJT Q2 is electrically connected to the resistors R1 and R2, and the collector of the BJT Q2 is electrically connected to the resistor R3. The two diodes D3 and D4 are series-connected to each other and to the resistor R1. The collector of the BJT Q2 is further electrically connected to the two inverters 32 and then connected to the AND gate 28. Please note that the positive node A of the diode D3 is the same as the node A in FIG. 2.

The operation of the voltage detector 25 in FIG. 4 is illustrated as follows: It is assumed that the voltage provided by the battery is 2V, and the voltage needs to be boosted to 3.5V (this means that the predetermined value is 3.5V). At first, the voltage Va of the node A is the value of 2V subtracting the voltage of diode D1 (refer to FIG. 2). The value is so small that the transistor Q2 cannot be turned on. Therefore, almost no current passes through the resistor R3 and the voltage of collector of the BJT Q2 is a high voltage near to 2V. The high voltage is still a high voltage whose logic level is 1 after passing through two inverters 32. The purpose of the two inverters lies in adjusting the logic level so that the high/low voltage of the collector of the transistor Q2 becomes a clear logic level 0 or 1 after passing through the two inverters 32. Subsequently, the voltage Va of the node A increases because of boosting. When the voltage Va of node A increases to 3.5V, the two diodes D3 and D4 are turned on so that the current can pass through the two diodes D3 and D4 and form a voltage on the base of the BJT Q2. The voltage of the base of the BJT Q2 is larger than the threshold voltage value of the BJT Q2 so that the BJT Q2 is turned on. At this time, significant current passes through the collector of the BJT Q2 and forms a voltage on the resistor R3 when passing through the resistor R3. Therefore, the voltage of the collector transistor Q2 becomes a low voltage so that the inverters 32 output a low voltage whose logic level is 0.

The diodes D3 and D4 are zener diodes in this embodiment, and the resistors R1 and R2 can be variable resistors. The number and type of the diodes are used to adjust the voltage range of the BJT Q2. So, the number is not limited as two and the type is chosen by design constraints. The transistor Q2 in the invention is not limited to being a BJT, and other transistors can also be used to achieve the function of the invention. In this embodiment, the fuel cell is used as the battery of the booster.

The oscillator 27 in FIG. 4 is a ring oscillator that comprises three inverters 32, two resistors R4 and R5, a capacitor C2 and a switch SW1. The three inverters 32 are series-connected and form a negative feedback loop for oscillating. The resistor R5 and the capacitor C2 are worked as a filter that can adjust the oscillating frequency of the oscillator and can be regarded as the frequency control circuit of the oscillator 27. The switch SW1 provides an option of separating the oscillating signals of oscillator 27 for users. The resistor R4 is used to avoid the floating connection of the AND gate 28 and the oscillator 27. The output of the voltage detector 25 and the output of the oscillator 27 are both connected to the AND gate 28. The output oscillating signal of the oscillator 27 and the output signal of the voltage detector 25 are outputted to the gate of transistor Q1 of the boosting circuit after the AND operation for turning on/off the transistor Q1.

The present invention uses the oscillator as a frequency generator to be the medium of controlling charging/discharging and to replace the prior art function of pulse width modulation. A diode and a resistor are set up on the output end for forming a feedback control circuit to adjust and protect the output voltage that we need. The output voltage is also used in the feedback control circuit for judging whether the voltage is high enough. If the output voltage has already reached the needed voltage and the feedback signal of the voltage detector is a low-level voltage, the output signal of the AND gate is a low-level voltage and the boosting circuit does not store power at this time. If the output voltage is lower than the needed voltage and the feedback signal of the voltage detector is a high-level voltage, the oscillating signal is outputted to the boosting circuit through the AND gate for charging quickly. The boosting circuit mainly transforms the input voltage of operation range 1.6V~5V. It can be used in mobile electrical products for quickly boosting the voltage because of the low power consumption, the convenience of the boosting circuit for adjusting the output voltage, the convenience of getting devices in the booster, and low cost.

The prior art booster continuously outputs the oscillating signals when the output voltage reaches the predetermined value. This causes the tank devices inside the booster to continuously process the cycle of transforming power even when booster operation is not required. This means that the power of the battery is consumed during the cycle of transforming power so that the battery only provides lower power to loads and the noise becomes larger. In contrast, the booster according to the present invention comprises a feedback control circuit for detecting whether the output voltage reaches a predetermined value and stopping the boosting circuit boosting when the output voltage is larger than the predetermined value so that the power of the battery is saved. As a result, the booster according to the present invention has the advantages of low power consumption, high transforming efficiency, and low cost and is suitable for electrical products.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A booster comprising:
  a boosting circuit for boosting an input voltage to a predetermined output voltage, the boosting circuit comprising a transistor for controlling the boosting circuit to adjust the output voltage;
  an oscillator for generating oscillating signals when the boosting circuit boosts the input voltage; and
  a voltage detector electrically connected to the boosting circuit for controlling the transistor of the boosting circuit to switch off and prevent the boosting circuit from adjusting the output voltage when detecting that the output voltage of the boosting circuit reaches a predetermined voltage, the voltage detector comprising:
    a diode;
    a first resistor;
    a second resistor;
    a third resistor; and
    a bipolar junction transistor (BJT);
  wherein an emitter of the BJT is grounded, a collector of the BJT is electrically connected to a first end of the first resistor, a base of the BJT is electrically connected to first ends of the second and the third resistors, a second end of the second resistor is grounded, a second end of the third resistor is electrically connected to a positive pole of the diode, and a negative pole of the diode is electrically connected to both a second end of the first resistor and the output voltage of the boosting circuit.

2. The booster of claim 1 wherein the oscillator is a ring oscillator.

3. The booster or claim 1 wherein the oscillator further comprises a frequency control circuit for setting the frequency of the oscillating signal generated by the oscillator.

4. The booster of claim 1 wherein the input voltage is provided by a fuel cell.

5. The booster of claim 1 further comprising a pair of series-connected inverters electrically connected to the collector of the BJT for adjusting a logic level.

6. The booster of claim 1 wherein the second resistor or the third resistor is a variable resistor.

7. The booster of claim 1 wherein the diode is a zener diode.

8. A method of boosting battery output, the battery electrically connected to a booster comprising a boosting circuit, an oscillator, and a voltage detector, the voltage detector comprising a diode, a first resistor, a second resistor, a third resistor, and a bipolar junction transistor (BJT), the method comprising:
  detecting an output voltage of the booster with the voltage detector;
  when the output voltage is lower than a predetermined voltage, the voltage detector controlling a transistor of the boosting circuit to turn on for adjusting the output voltage using periodic pulse signals generated by the oscillator; and
  when the output voltage reaches the predetermined voltage value, with the voltage detector turning off the transistor for preventing the boosting circuit from adjusting the output voltage;
  wherein an emitter of the BJT is grounded, a collector of the BJT is electrically connected to a first end of the first resistor, a base of the BJT is electrically connected to first ends of the second and the third resistors, a second end of the second resistor is grounded, a second end of the third resistor is electrically connected to a positive pole of the diode, and a negative pole of the diode is electrically connected to both a second end of the first resistor and the output voltage of the boosting circuit.

9. The method of claim 8 wherein the oscillator further comprises a frequency control circuit for setting the frequency of the oscillating signal generated by the oscillator.

10. The method of claim 8 wherein the battery is a fuel cell.

11. The method of claim 8 wherein the voltage detector further comprises a pair of series-connected inverters that are electrically connected to the collector of the BJT for adjusting a logic level.

12. The method of claim 8 wherein the second resistor or the third resistor is a variable resistor.

13. The method of claim 8 wherein the diode is a zener diode.

* * * * *